United States Patent [19]

Claes et al.

[11] Patent Number: 5,812,246
[45] Date of Patent: Sep. 22, 1998

[54] PHOTOGRAPHIC CONTACT PRINTING DEVICE

[75] Inventors: Marc Claes, Wijnegem; Lambertus Boons, Kontich, both of Belgium

[73] Assignee: Agfa-Gevaert N.V., Mortsel, Belgium

[21] Appl. No.: 608,255

[22] Filed: Feb. 28, 1996

[30] Foreign Application Priority Data

Mar. 2, 1995 [EP] European Pat. Off. ............. 95200507

[51] Int. Cl.⁶ .................................................. G03B 27/04
[52] U.S. Cl. .................. 355/99; 355/91; 355/117; 355/119; 362/297; 362/298; 362/300; 362/346; 362/347
[58] Field of Search .................. 355/91, 99, 67, 355/117, 119; 362/297, 298, 300, 346, 347

[56] References Cited

U.S. PATENT DOCUMENTS

| | | |
|---|---|---|
| 1,763,208 | 6/1930 | Altman ................................ 355/117 |
| 3,758,774 | 9/1973 | Hilldenbrandt ........................ 355/67 |
| 3,850,523 | 11/1974 | Skavnak ................................. 355/119 |
| 4,225,923 | 9/1980 | Blomendaal et al. .................. 355/67 |
| 4,473,865 | 9/1984 | Landa ..................................... 355/67 |
| 4,518,249 | 5/1985 | Murata et al. .......................... 355/67 |
| 4,711,570 | 12/1987 | Nelen .................................... 355/91 |
| 4,714,947 | 12/1987 | Nishida et al. ......................... 355/91 |
| 4,733,280 | 3/1988 | Irie ........................................ 355/67 |
| 4,747,033 | 5/1988 | Yasuda ................................... 355/67 |
| 4,754,309 | 6/1988 | Lesko ..................................... 355/91 |
| 4,755,854 | 7/1988 | Theimer ................................. 355/91 |
| 4,816,875 | 3/1989 | Takeda et al. ......................... 355/67 |
| 4,851,975 | 7/1989 | Kanai ..................................... 355/67 |
| 5,075,720 | 12/1991 | Takeda et al. ......................... 355/67 |

*Primary Examiner*—Arthur T. Grimley
*Assistant Examiner*—Shival Virmani
*Attorney, Agent, or Firm*—Brumbaugh, Graves, Donohue & Raymond

[57] ABSTRACT

A photographic contact printing device has a point-like light source (17) and two uni-directionally curved parabolically cylindrical mirrors (18, 19) the axis of curvature (22, 23) of which are perpendicular to each other, and one axis (23) being parallel to the exposure plane.

8 Claims, 4 Drawing Sheets

PHOTOGRAPHIC CONTACT PRINTING DEVICE

BACKGROUND OF THE INVENTION

1. Field of the Invention

The present invention relates to a photographic exposure device with a point light source for the exposure of a light-sensitive recording material through a transparent image-bearing sheet (original) kept parallel therewith and more in particular, kept in contact therewith.

2. Description of the Art

Contact copying or exposure is a traditional graphic arts procedure for generating same size, high resolution reproductions of line and screened images. This technique ensures faithful original image reproduction by placing the original image in intimate contact with a receiving photographic emulsion (plate, film or paper) and, in the presence of a vacuum to hold them in intimate contact throughout the exposing process, exposing through the original image the receiving film or paper by means of a direct or reflected point light source. Typically, these images are of a relatively large size in order to meet the needs of the graphic arts industry and thus require large format originals and receiving films and the equipment necessary to handle such sized films.

One of the most important aspects of the graphic arts contact exposing process is the need for accurately reproducing very fine lines and screen dots. This has resulted in the requirement that the exposing light be collimated at the exposing plane so that such lines and dots can be reproduced accurately without undercutting or spreading and changing the size of the reproduced line or dot and the resulting image. Adequate light collimation has been achieved in the past by using a point light source mounted at a sufficiently great distance from the exposing plane so that the spherical angle at which the light arrives at the exposure plane is sufficiently small. An advantage of exposure frames of the described type is their simple construction. Since, however, the physical dimensions of an exposure device are limited, the ratio between the distance of the light source to the exposing plane and the size of such plane is correspondingly limited so that the exposure beam is in fact a cone of light, only the central portion of which is perpendicular to the exposing plane.

Given the large exposing plane area necessary for graphic arts purposes and the need for a high degree of light collimation to achieve accurate image reproduction, other arrangements have been proposed.

One arrangement comprises a Fresnel lens, the surface of which is equal to or larger than that of the original, and which is mounted close to and parallel to the original, a point light source being positioned in the focal point of the Fresnel lens.

In another arrangement, (part of) a spherical parabolic mirror, the surface of which is equal to or greater than the original, is used to collimate the light of a point shaped light source in the focal point of this mirror, the reflected beam of collimated light then being emitted perpendicular to and through the original to expose the photosensitive material.

Both of these arrangements have major disadvantages.

The use of spherical mirrors is limited by the accuracy of their finishing, requiring the use of polished glass mirrors which, for the surfaces required, makes their cost prohibitive for most applications.

Fresnel lenses absorb too much light in that part of the spectrum (near-ultraviolet) used most in the graphic arts industry for this purpose, and they exhibit too much diffusion of the light, which is disadvantageous for the application considered.

SUMMARY OF THE INVENTION

Objects of the Invention

It is an object of the present invention to provide a photographic exposure device which has means for collimating light from a point-shaped light source to a parallel beam of light to expose a photosensitive material through an original.

It is a further object of the invention to avoid the cost of spherical parabolic mirrors, and to avoid the diffusion and the light absorption of Fresnel lenses.

Statement of Invention

In accordance with the present invention, a photographic exposure device, comprising means for holding a transparent image-bearing sheet (original) and a light-sensitive recording sheet both in a flat plane and parallel to one another, and a point light source for projecting light through the original onto the recording sheet, is characterised thereby that in the light beam from the point light source to the original, there are provided two uni-directionally curved mirrors, the one (i.e. the second) of said mirrors which is last on the path of the light beam to the original being parabolic cylindric and its axis of curvature running perpendicular to said flat plane, and the one (i.e. the first) of said mirrors which is first on the path of light to the original being likewise parabolic cylindric and its axis of curvature running perpendicular to the axis of curvature of said second mirror, whereby the light beam of said light source after reflection by said first and second mirrors impinges on the original at all points under substantially the same angle of exposure.

The term "angle of exposure" denotes the angle measured between the direction of incidence of the light beam and the normal to the plane of the original at the point of incidence. In most applications the angle of incidence is (close to) 0°.

A device according to the statement hereinbefore avoids the disadvantages of the prior art devices described hereinbefore and can be constructed in a relatively cheap way.

The term "substantially the same angle" stands in the present specification for deviations of the angle of incidence not larger than 10 and preferably less than 5 angular degrees.

The device according to the invention can comprise means for holding the image-bearing sheet and the light-sensitive sheet parallel to one another while yet separated from each other, over a small distance, because the use of truly collimated light does not require bodily contact of the sheets. However, in the case of deviations of the angle of incidence up to 10 degrees as described hereinbefore, the exposure can cause enlargements, reductions and/or deformations of the reproduced image, and in such case it is preferred that both sheets are held in contact with one another. Holding both sheets in tight contact with one another can occur as known in the arts by means of a so-called vacuum exposure frame.

The term "point light source" as used in the present specification stands for any source capable of performing the required image-wise exposure of a light-sensitive sheet to an original.

Thus, traditional silver halide contact films having sufficient photographic sensitivity to visible light can be exposed with a simple, low-cost, low-energy incandescent light source. However, because of the sensitivity of these films to visible light, the contact exposure must be carried out in a darkroom environment. This causes a major inconvenience for the operator and results in a loss of productivity in the graphic arts production process.

In an attempt to improve graphic arts contact exposure productivity, film manufacturers have developed normal roomlight handling contact film. These films are photographically very insensitive to visible light, but have a relatively high UV sensitivity. These films are exposed by means UV output light sources. Metal halide light sources are a common type of UV light source used to expose these films.

Other suitable embodiments of a device according to the invention are as follows.

The device comprises a light-absorbing coating on the second mirror or on a separate transparent surface that is located in the light path between the point light source and the exposure surface, the local density of said coating being such that the intensity of light which arrives at the exposure surface is uniform to a desired degree at any place of said surface.

The use of an optical shutter in case metal-halide discharge lamps are used as a point UV-source is indispensable since in practice these lamps are permanently on when the exposure device is in use, the lamps being switched to a fraction of full power during the preparations for a next exposure. We refer to our co-pending EP application 0 476 186 A1 relating to a photographic exposure device with a UV-emitting metal-halide discharge lamp in which the lifetime of the lamp is substantially increased by intermittently energising at full power during short intervals in the standby phase.

The lamp of a device according to the invention is suitably a high-pressure mercury halide vapour or a halogen incandescent lamp.

The inventive device is a bottomlight or toplight exposure cabinet.

BRIEF DESCRIPTION OF THE DRAWINGS

The invention will be described hereinafter by way of example with reference to the accompanying figures, wherein.

DETAILED DESCRIPTION OF THE INVENTION

Figure 1:
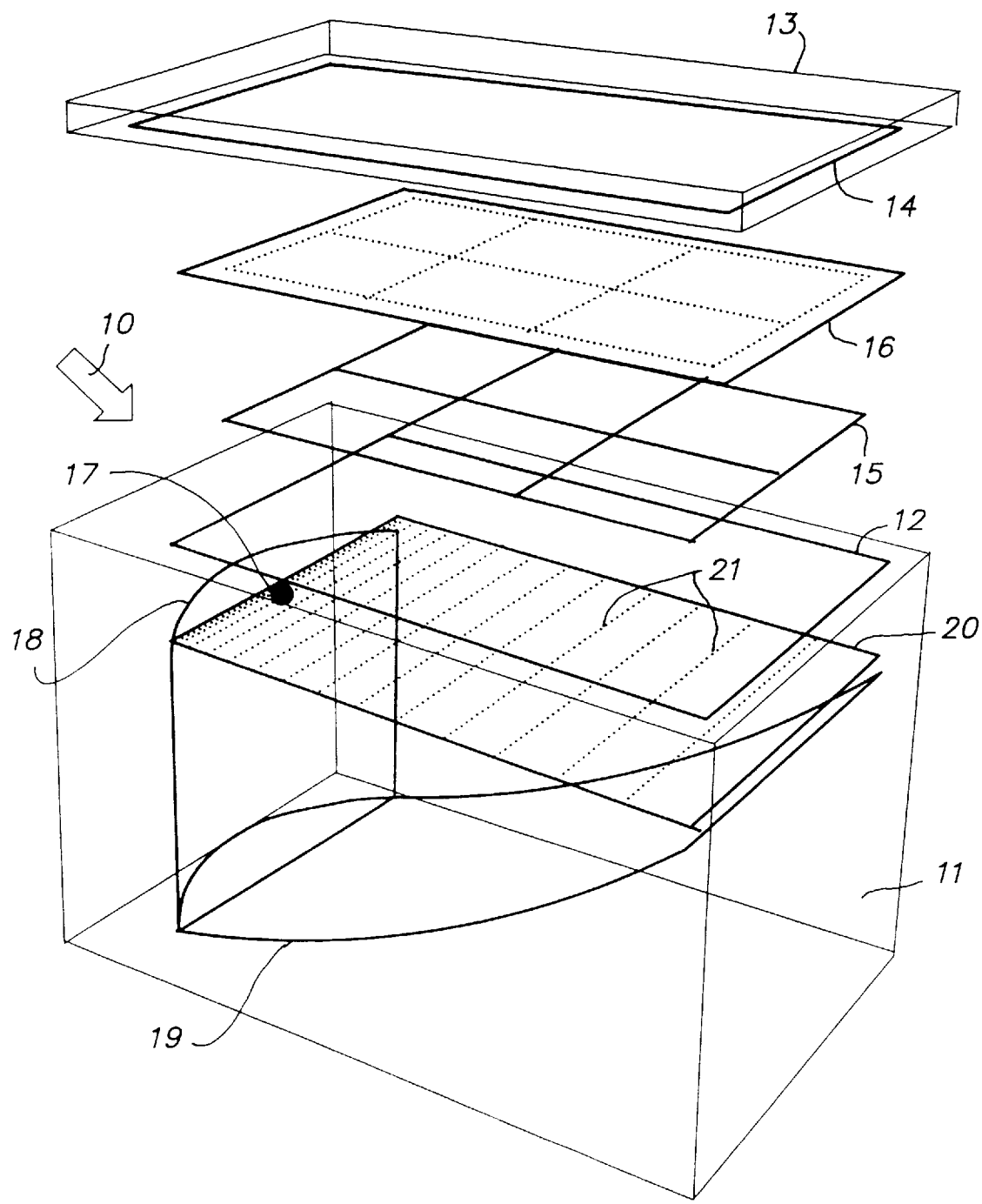
FIG. 1 is an exploded view of one embodiment of a device according to the invention.

FIG. 1 diagrammatically shows a bottom light contact exposure device 10 in the form of a lighttight rectangular cabinet 11 the top of which is provided with a glass plate 12 and a cover 13 with a vacuum blanket 14 for holding a transparent original 15, that is a transparent image-bearing sheet, in contact with a light-sensitive film sheet 16. Cover 13 and blanket 14 are arranged as a vacuum cover known in the art for keeping both sheets in tight contact with each other on the glass plate 12. Cover 13 is fitted by hinges, arms or the like to cabinet 11, so as to allow convenient opening and closing thereof. Glass plate 12, original 15, film sheet 16 and cover 13 with blanket 14 are shown separated from each other for drawing clarity only. In reality they are in tight contact with one another.

Inside cabinet 11 the following members are provided:
  a point light source 17 (shown uncovered for clarity only; in reality it is screened so that it emits light only on the first mirror 18)
  a parabolically cylindric mirror 18, being first in the path of light from point light source 17 to film sheet 16, and
  a transparent support 20 with a light absorbing coating 21 (indicated by way of example by a number of dotted lines 21, the density of which varies from one end to the other of the support), the local optical density being such that the intensity of light arriving at the original 15 is uniform to a desired degree at any place on said original.

Figure 2:
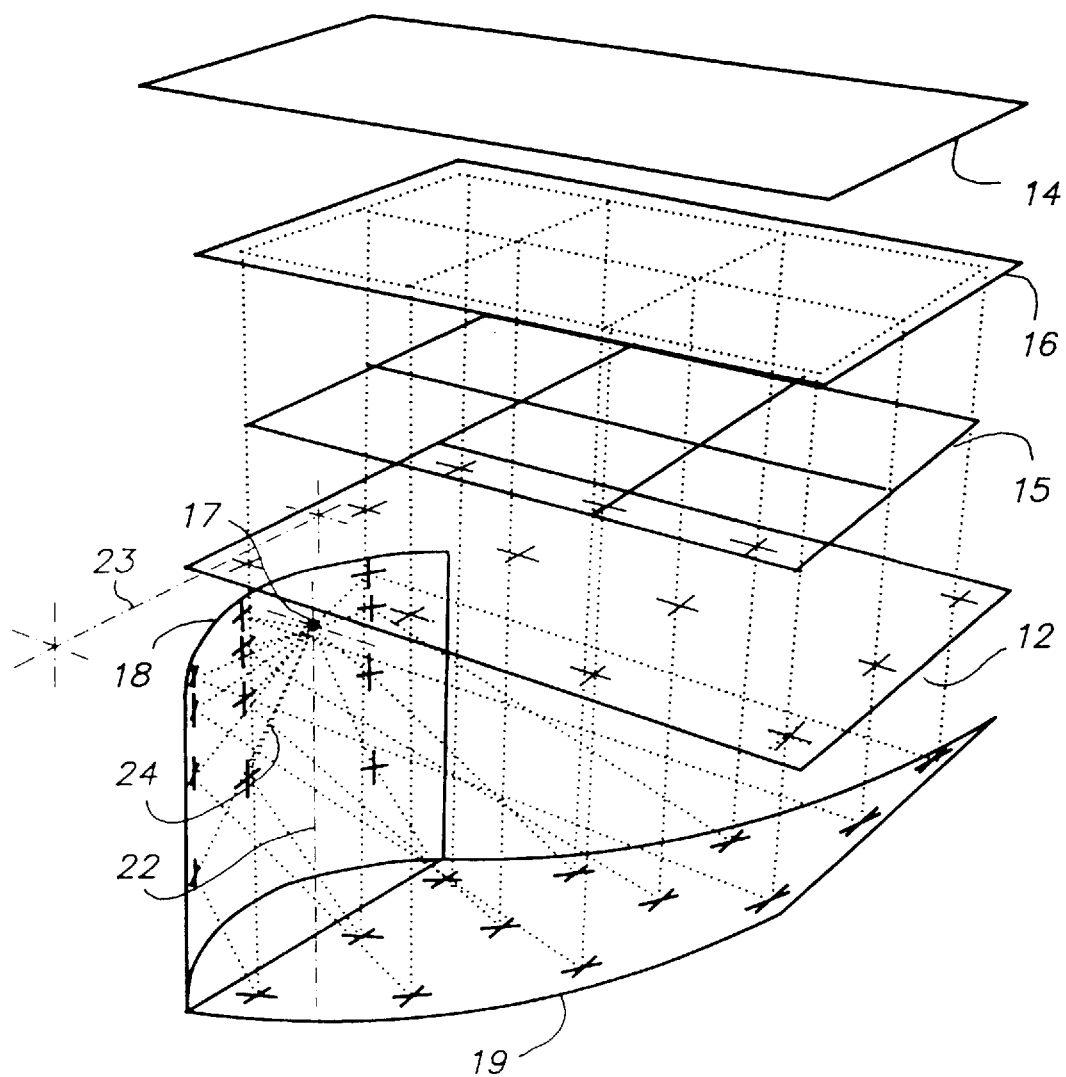
FIG. 2 shows a number of light paths in the device of FIG. 1.

FIG. 2 shows the same arrangement, but without cover 13 and cabinet 11. The axes of curvature, 22 of mirror 18, and 23 of mirror 19 are shown in dash and dot lines. The axis 22 of mirror 18 is normal to the plane of platen 12, whereas the axis 23 of mirror 19 runs normal to axis 22. Shown by way of example in dotted lines, are twelve distinct light beams 24, emanating from lamp 17, reflecting on both mirrors 18 and 19, going through glass plate 12 and original 15 on to film sheet 16, as indicated by corresponding cross marks.

Figure 3A:
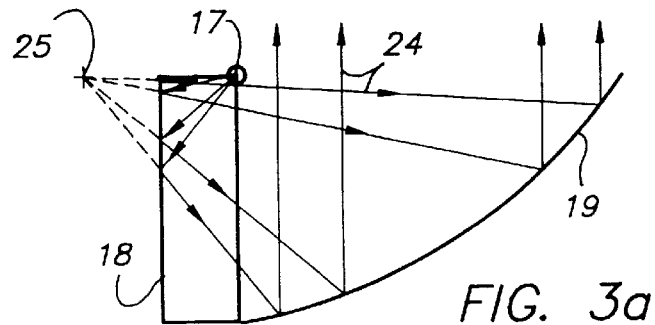
FIG. 3a is a diagrammatic vertical, and FIG. 3b a diagrammatic horizontal section of FIG. 2 though the light source, showing reflected light paths.
Figure 3B:
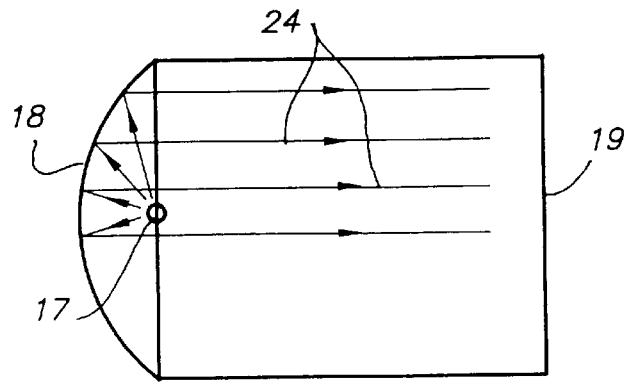

FIGS. 3a and 3b are two-dimensional representations of the reflected light paths in the embodiment of the device according to FIGS. 1 and 2. The same numerals have been used throughout the drawings, except for 25, which indicates in FIGS. 3a and 3b the virtual image of light source 17.

Figure 4A:
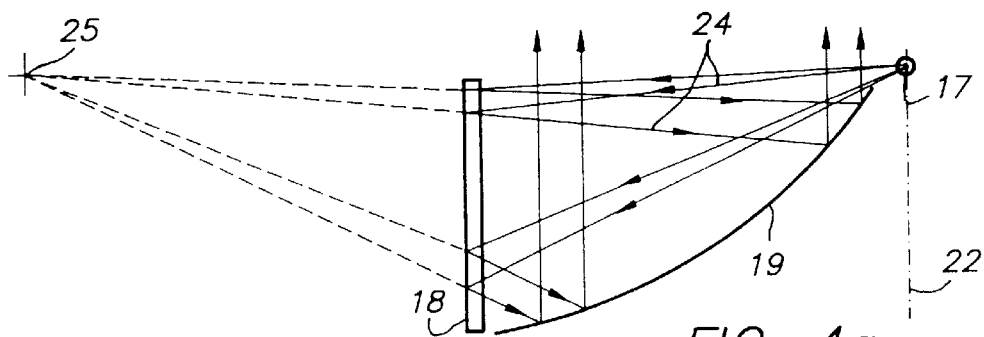
FIG. 4a is a diagrammatic vertical, and FIG. 4b a diagrammatic horizontal section of an other embodiment of the inventive device, showing reflected light paths.
Figure 4B:
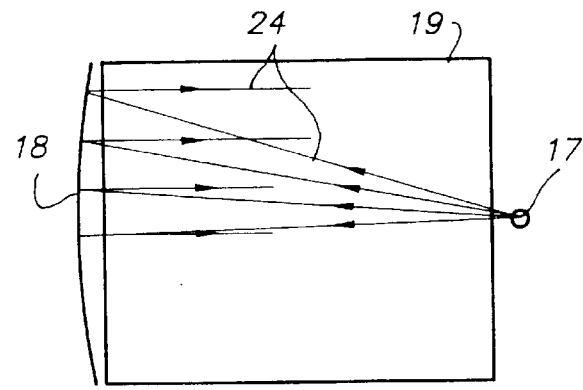
Figure 5:
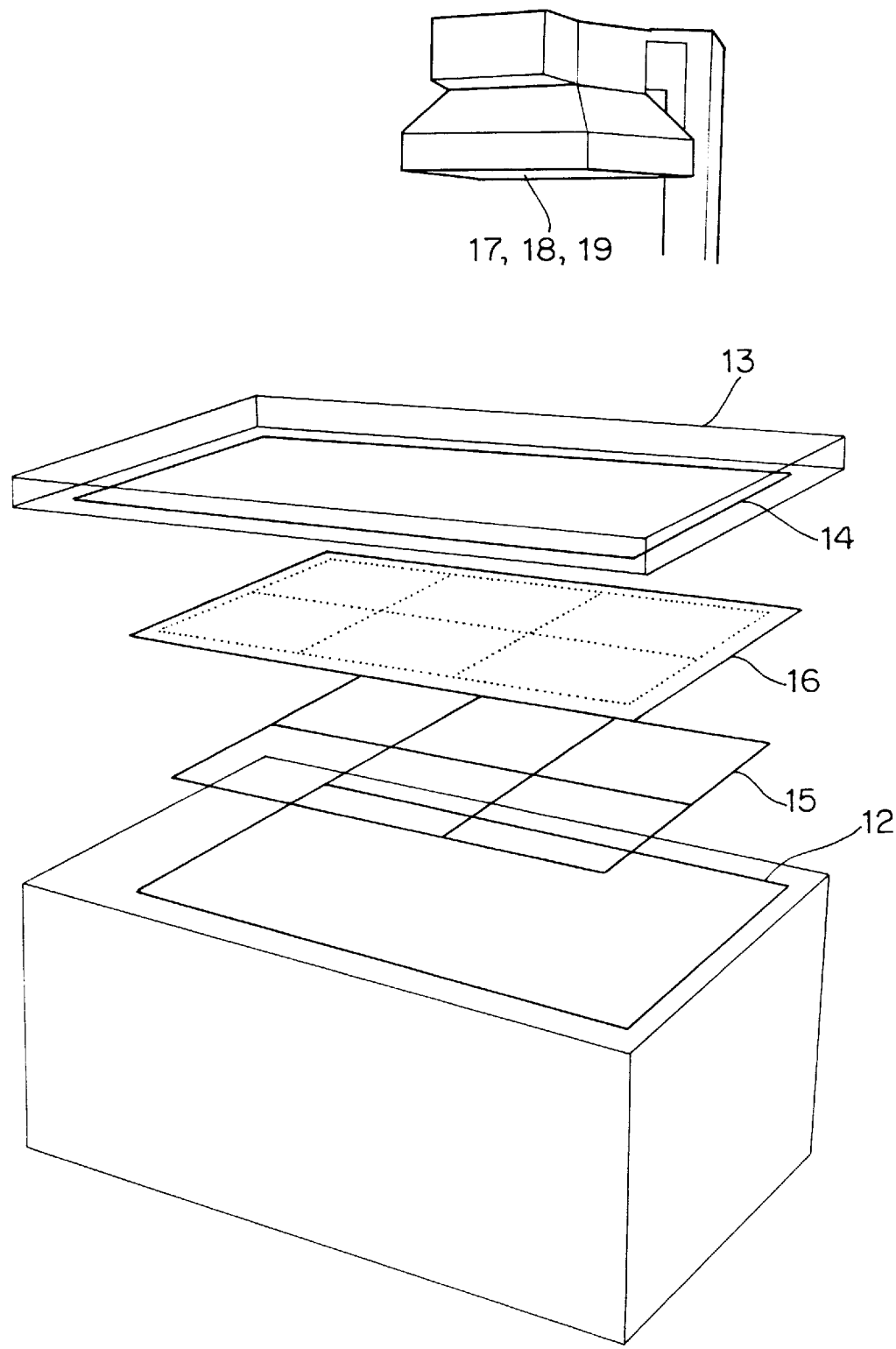
FIG. 5 is an exploded view of another embodiment of a device according to the invention.

FIGS. 4a and 4b are two-dimensional representations of the reflected light paths in an embodiment of the device in which mirror 18 is less curved than the one of FIGS. 3a and 3b so that its axis of curvature 22 is located at the other end of mirror 19, and lamp 17 is correspondingly located at said other end. The position of the virtual image of light source 17 is in this figure equally indicated by 25.

The embodiment of the invention described above, with the point light source 17, mirror 18, and mirror 19 located beneath the glass plate 12, is commonly known to those skilled in the art as a bottomlight frame.

The invention is not limited to the embodiment of the invention described hereinbefore.

It will be understood that the exposure frame can be a toplight frame, in which the lamp and mirrors are suspended (a sizeable distance) above a (hinged) frame with glass plate, under which the original and the film sheet are placed.

The lamp can be arranged so as to use more of its light for the exposure (i.e. by means of optical systems, such as mirrors and/or lenses, or an internal reflective coating, for directing light that otherwise would be lost) on mirror 18.

The light-absorbing coating 21 on support 20 can also be provided on one of the mirrors 18 or 19 or on the exposure plates 12 to obtain the desired compensation for local intensity deviations of the exposure light. If the characteristics of the photographic material to ba image-wise exposed are such that the material tolerates variations up to a degree which is larger than variations caused by mirrors 18 and 19, such compensating light-absorbing coating may be omitted.

The point light source in an exposure device according to the invention is not limited to a high-pressure mercury halide vapour or halogen incandescent lamp as mentioned hereinbefore.

Location of an image-bearing and a light-sensitive recording sheet for exposure may occur by other suitable means than a vacuum cover, glass plate and cabinet as described hereinbefore. E.g. if the light-sensitive sheet has the form of a glass plate with a light-sensitive coating thereon, and the transparent image-bearing sheet has a glass plate as support as well, no vacuum cover system is required to keep both elements in accurate parallel relationship.

We claim:

1. A photographic contact printing device comprising means (12, 13, 14) for holding a transparent image-bearing sheet (15), (i.e. original) and a light-sensitive recording sheet (16) both in a flat plane and parallel to one another, and a point light source (17) for projecting light through the original onto the recording sheet, characterised in that in the light beam from the point light source to the original there are provided two uni-directionally curved mirrors, the one (19) (i.e. the second) of the said mirrors which is last on the path of the light beam to the original being parabolically cylindric and its axis of curvature (23) running parallel to said flat plane, and the one (18) (i.e. the first) of said mirrors which is first on the path of the light beam to the original being likewise parabolically cylindric and its axis of curvature (22) running perpendicular to the axis of curvature of said second mirror, whereby the light beam of said light source (17) after reflection by said first and second mirrors, impinge on the original under substantially the same angle of incidence.

2. A device according to claim 1, which comprises a light-absorbing coating (21) on a transparent support (20) that is located between the point light source (17) and the image-bearing sheet (15), the local density of said coating being such that the intensity of light which arrives at the image-bearing sheet is uniform to a desired degree at any place of the surface of said sheet.

3. A device according to claim 1, which comprises a light-absorbing coating on said second mirror, the local density of said coating being such that the intensity of light which arrives at the image-bearing sheet, is uniform to a desired degree at any place of the surface of said sheet.

4. A device according to claim 1, in which said angle of exposure amounts to zero degrees.

5. A device according to claim 1, wherein said lamp (17) is a high pressure mercury halide vapour lamp.

6. A device according to claim 1, wherein said lamp (17) is a halogen incandescent lamp.

7. A device according to claim 1, which is a bottomlight exposure device (10).

8. A device according to claim 1, which is a toplight exposure device (10).

* * * * *